Sept. 5, 1967  M. H. BECKMAN  3,339,952

CONSTRUCTION BOLT OR FASTENER

Filed April 8, 1965

INVENTOR:
MELVIN H. BECKMAN
BY Wilson & Geppert
ATTORNEYS

# United States Patent Office 3,339,952
Patented Sept. 5, 1967

3,339,952
CONSTRUCTION BOLT OR FASTENER
Melvin H. Beckman, Rockford, Ill., assignor to National Lock Co., Rockford, Ill., a corporation of Delaware
Filed Apr. 8, 1965, Ser. No. 446,517
1 Claim. (Cl. 287—189.36)

The present invention relates to a novel construction bolt or fastener of conventional, self-tapping or thread-forming, or self-drilling and tapping bolt and to a novel means and manner of threading and connecting two or more members into abutting relation, thereby replacing conventional fastening means including rivets, bolts, nuts, washers and lock washers.

In construction work, spaces or gaps commonly occur between members to be joined and frequently it is impractical to eliminate such spaces or gaps before driving and joining these members in abutting relation. For this reason, it is common practice to employ bolts and nuts to draw such members together for holding purposes even though it may be contemplated or required to subsequently weld or rivet these members together in their final assembly.

The present novel construction bolt or fastener is provided with a head which may be of any conventional form capable of producing a torque for driving by means of hand, power, torque or impact wrenches or screwdrivers, or other devices; and a shank having a smooth portion so constructed and arranged as to crush, deform or swage the internal threads formed in a held plate or member and a threaded portion for fastening in a holding plate or member; and an end portion of various self-drilling and tapping, self-tapping or threading or the conventional threaded portion of a bolt for nut and washer application when the held and holding members or plates are pre-tapped.

It is an important object of the present invention to provide a novel construction bolt or fastener having the novel means and manner of joining and retaining structural and non-structural members in rigid and yet flexible assembly.

Another important advantage of the present construction bolt or fastener is the elimination of the use of bolts, lock washers and nuts in the field. It also provides for a one-sided or blind application wherever described or required, thereby eliminating the conventional use of welded studs for this purpose, such as in boiler applications, tubular columns, box beams, etc.

Thus, an important advantage of the present invention is that it is particularly adapted for use in construction work where spaces or gaps commonly occur between members to be joined and where it is impractical to eliminate such spacing or gaps before driving. With this novel construction bolt or fastener, a space can be present between the members to be joined when the fastener enters the held member and even when the fastener enters the holding member. In the assembly, as the smooth shank portion of the fastener enters and passes through the formed internally threaded opening of the held member, its shoulder engages the crests of the internal thread and crushes, swages and deforms the thread while permitting the fastener to continue to turn in the held member as the threaded portion of the fastener forms a thread in the holding member, thus causing the threaded portion in the holding member to pull against the held member until these plates are tightly drawn into abutting relation and retained in such final assembly.

The present invention further comprehends a novel construction bolt or fastener for joining and retaining in abutting relation plural members including a held and a holding member and in which each of said members is provided with a pilot- or self-drilled opening in which internal threads are formed by said fastener by a swaging action, the thread-forming fastener having a smooth shank portion and a shoulder at the termination or adjacent end of the threaded portion, the diameter of the smooth shank portion corresponding to or substantially that of the pitch diameter of the threaded portion of the fastener whereby its shoulder at the end of the smooth shank portion forcibly engages and deforms, swages or crushes the crests of the internal threads formed by the fastener in the held member as the fastener continues to turn in the threaded opening in the held member, whereupon the fastener pulls into the holding member and therein forms an internal thread for drawing these members together and joining them in rigid assembly. This novel configuration can also be adapted to conventional bolts or fasteners when desired and when the held and holding members or plates are pre-tapped.

Deformation, crushing or swaging of the tapped internally formed threads in the held member securely anchors and retains the smooth shank of the fastener in this held plate and prevents it from backing out, thus providing an effective bearing although permitting the fastener to continue to turn in the held member while drawing the holding plate or member into tight engagement with the held plate or member.

This novel bolt or fastener provides a most effective means and manner of joining in rigid or flexible assembly plural parts in building constructions, aircraft, transmissions, towers, antennae, boiler applications, sub-assemblies and many other uses heretofore requiring bolts, nuts and lock washers, welded studs, etc. As the swaging and deformation of the threads in the held plate locks the fastener against backing off, this permits the fastener to be employed wherever vibration tends to loosen other forms of fastening means, it being readily appreciated that turning back the present fastener could not be accomplished without reforming of the deformed thread.

Although the drawing discloses the novel construction bolt or fastener employed in uniting a holding plate to one or more held plates preferably of light or heavy steel construction as distinguished from sheet metal or metal of limited thickness, the novel fastener may be employed with any material suitable for the purpose, such as where the holding plate is of plastic, wood or other materials of sufficient thickness to produce the requisite pulling force, and that the bolt or fastener can consist of various materials.

Further objects are to provide a construction of maximum simplicity, efficiency, economy and ease of assembly and operation, and such further objects, advantages and capabilities as will later more fully appear and are inherently possessed thereby.

Figure 1:
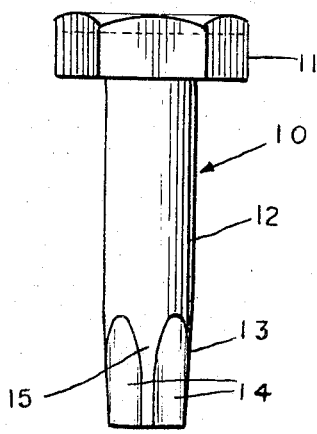
FIG. 1 is a side elevational view of one embodiment of a fastener blank after forming of its head and its tapered or conical point with its flattened sides but before forming or rolling the spiral thread on the point and the lower portion of the shank.
Figure 2:
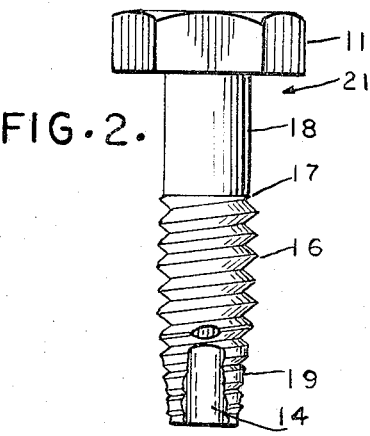
FIG. 2 is a side elevational view of one embodiment of the construction bolt or fastener after forming of the rolled thread on the shank.

Referring to the disclosure in the drawing, in one method of producing the novel construction bolt or fastener it is extruded of a blank 10 of drawn wire initially formed to provide a suitable head 11 of any conventional shape capable of producing a torque for driving by means of a suitable hand or power tool, torque or impact wrench or screwdriver and other devices, and a cylindrical shank 12 having its end 13 extruded or compacted into conical shape with symmetrically arranged and spaced flattened sides or relief areas 14, the planes of the relief areas tapering inwardly toward the end with alternate, rounded tapered ridges 15 therebetween. In the disclosed embodiment, these flattened sides formed by compacting the metal as distinguished from removal of metal thereat, conform the end 13 as a substantially square extremity with rounded corners having a given uniform radius.

The formed thread 16 is progressively swaged or rolled onto the lower portion of the cylindrical shank 12 of the blank and its conical end 13 with its flattened sides 14, with the diameter of the cylindrical shank being approximately the pitch diameter of the continuously formed threaded portion of the shank. Thus, this diameter is greater than the root or minor diameter and less than the maximum, major or crest diameter of the formed thread. The end of the continuous thread 16 terminates at a shoulder 17 formed at the adjacent end of the smooth shank portion 18 of the resulting fastener.

The spiral thread 16 is rolled onto the end of the shank portion and the spaced corners or ridges 15 of the conical portion with the thread at 19 interrupted by the relief areas or sides 14, and the interrupted thread 19 on the conical end portion 13 of the fastener having relatively wide and dished or concaved crests 20. The width of the interrupted portions 19 of the thread 16 varies and decreases toward the head 11 where it merges into the continuous portion of the thread 16 extending to the shoulder 17 at the adjacent end of the smooth shank portion 18. As the formation of the thread on the formed fastener or bolt 21 progresses, eccentric relief areas are generated with the flattened areas 14 becoming slightly concaved to provide areas of full relief.

The interrupted portions 19 of the thread so formed provide for the initial swaging action when the bolt or fastener is inserted into a preformed pilot opening in members to be joined, such as an opening in a held plate or member 22, and a pilot opening in a holding plate or member 23 to be joined thereto. In such an assembly, the smooth shank portion 18 of the fastener is of a length substantially that of the thickness of the held plate 22 which the smooth shank portion 18 penetrates and the holding plate 23 is the adjoining part to be affixed thereto and held by the threaded portion 16 with full threads.

The present novel construction bolt or fastener 21 may be attached to a held plate or member 22 at the factory or fabrication shop either by being completely or partially driven through a pilot opening or the novel bolt or fastener may be applied thereto in the field.

Figure 6:
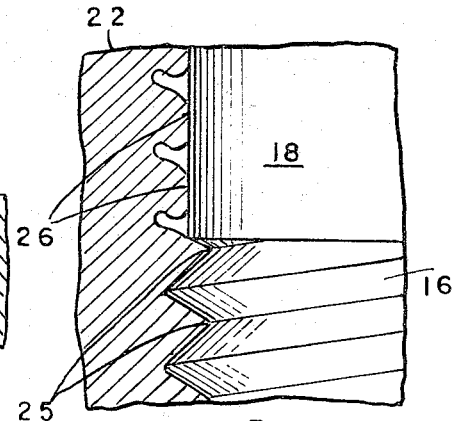
FIG. 6 is a fragmentary portion of the held plate or member to show the manner in which the internal thread in the held plate is deformed by the entering shoulder at the end of the smooth portion of the shank of the bolt or fastener.

The reduced end of the bolt 21 enters the pilot opening and is forced against the plate 22 and turned by a conventional or power-driven tool having a bit conformably engaging the head 11. Rotation and axial pressure applied to the tool turns the bolt in the opening to form a continuous internal thread 24 in the opening of this plate 22 by a swaging as distinguished from a cutting action and, when the shoulder 17 of the smooth shank portion 18 reaches and engages the crests 25 of the internally formed thread 24 it forcibly swages or deforms at 26 these tapped internal threads into the roots or valleys of these threads as shown in FIGS. 4 and 6, resulting in a tight bond being formed between the shank portion 18 and the held plate 22 although permitting the fastener or bolt 21 to continue to turn into the threaded opening of the held plate and draw it tight against the head 11.

In joining the holding plate or member 23 to the held plate or member 22, the plate 23 is provided with a pilot opening of a diameter permitting several pitches of the interrupted thread 19 at the conical end of the fastener 21 to enter the pilot opening. Thereupon, turning of the head 11 of the self-tapping or thread-forming fastener 21 forms a continuous internal thread 27 in the plate 23. This threaded engagement between the bolt 21 and the holding plate 23 and the continued turning of the bolt by a suitable driving tool, causes the bolt to draw the holding plate into tight abutting contact with the held plate 22 and retains these plates anchored in assembled relation.

Figure 5:
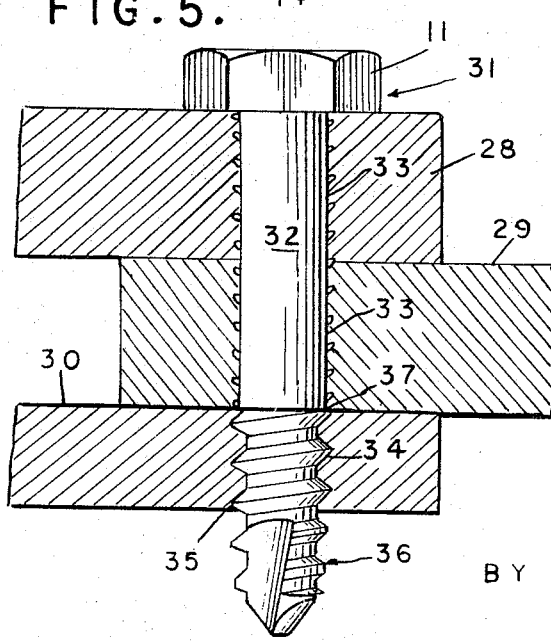
FIG. 5 is another embodiment of a different type of a self-drilling or thread-forming fastener in which the smooth portion of the shank is of a length adapted to project through plural held plates or members with the full threaded portion of the bolt projecting through and joining a holding plate or member to the held plates or members.

In the embodiment shown in FIG. 5, two held plates or workpieces 28 and 29 are shown to which a holding plate or workpiece 30 is threadedly affixed. The construction bolt or fastener 31 shown of a different and self-drilling type is disclosed as provided with an elongated smooth cylindrical shank portion 32 of a length to project through the threads 33 formed in the openings in the plates or members 28 and 29, a threaded shank portion 34 received in the internal thread 35 formed in the holding plate 30, with the self-drilling end portion 36 projected therethrough. This form of fastener cuts or forms its own mating thread while eliminating hole preparation and tapping operations.

Figure 3:
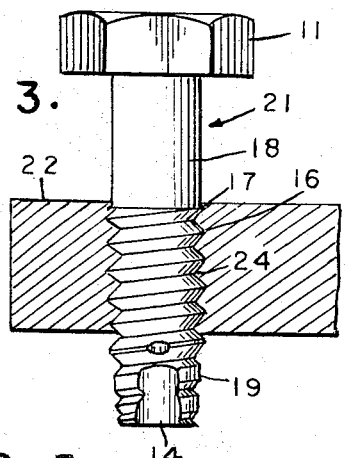
FIG. 3 is a side elevational view of the one embodiment of the thread-forming fastener after it has been driven into and formed an internal thread in a held plate or member.
Figure 4:
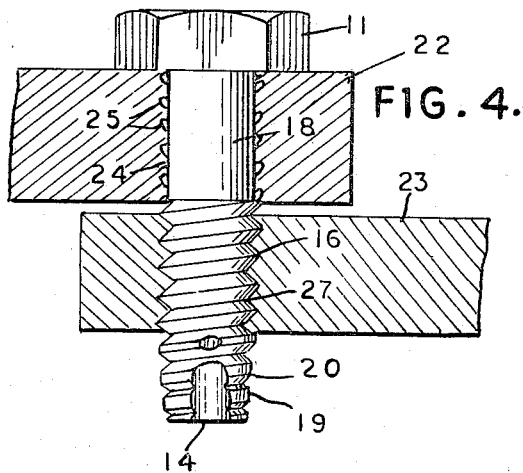
FIG. 4 is a side elevational view of the one embodiment of the thread-forming fastener after it has been driven into and through the held plate or member as well as being driven through a holding plate or member for joining these plates which are shown in spaced relation before being drawn into abutting position.

As in the embodiment in FIGS. 3 and 4, the diameter of the smooth shank portion 32 corresponds to or is substantially that of the pitch diameter of the thread of the continuously formed threaded portion 34 of the shank so that the crests of the internal thread 33 formed in the held plates 28 and 29 are deformed or swaged by the entering shoulder 37 at the juncture of the smooth shank portion 32 and the threaded shank portion 34 of the fastener 31.

When additional friction or pressure is required between the holding plate or member 23 and the held plate or member 22 or between the holding plate or member 30 and the held plates or members 28 and 29, the full threaded portion 16 or 34 of the fastener or bolt shall be lengthened sufficiently to provide full thread for a nut or washer and nut application.

Although the drawings disclose the present invention embodied in two types of bolts or fasteners, it is not intended to be limited thereto but the invention is adapted to various forms of fasteners including self-drilling and thread-tapping or forming and self-tapping fasteners and those adapted for use in pre-drilled and pre-tapped plates or members.

Having thus disclosed my invention, I claim:

In combination, a construction bolt fastening together adjoining plural members including at least one held member and a holding member each having aligned openings, said bolt comprising a shank having an enlarged head at one end and a thread-forming part at the other end for forming a thread in the opening in each member, said shank having a smooth uninterrupted cylindrical part adjacent the head received in the held member, a spirally threaded part having a full thread of uniform crest and root diameters adjacent said thread-forming part received in said holding member, and a circumferential transverse shoulder between and defining the intersection of the smooth cylindrical part and the spirally threaded part of the shank, said smooth cylindrical shank and shoulder having a diameter substantially equal to the pitch diameter of the spirally threaded part and of a length corresponding to the thickness of said held member, said thread-forming part successively forming an internal thread in the aligned openings in said held member and then in said holding member, said holding member being joined to said held member with said thread-forming part projecting through and beyond the threaded opening in said holding member, the length of said spirally threaded part being at least as great as the thickness of said holding member, whereby the full thread is threadably engaged throughout the axial extent of the threaded opening of said holding member drawing said members together, said shoulder and said smooth cylindrical part of the shank upon entering the threaded opening of said held member engaging and deforming the crests of the internal thread in the opening of said held member with said deformed thread gripping the smooth cylindrical part of said bolt and retaining the bolt against backing out of said opening in the held member, said deformation of the crests being limited to the thread in said held member.

References Cited

UNITED STATES PATENTS

| | | | |
|---|---|---|---|
| 2,167,559 | 7/1939 | Upson | 151—22 |
| 3,169,565 | 2/1965 | Surratt | 151—14 |

FOREIGN PATENTS

| | | |
|---|---|---|
| 1,099,620 | 3/1955 | France. |
| 413,027 | 7/1934 | Great Britain. |

CARL W. TOMLIN, *Primary Examiner.*

R. S. BRITTS, G. A. MILWICK, *Assistant Examiners.*